March 25, 1930.  M. E. ROE  1,752,030
CASTER
Filed June 12, 1926
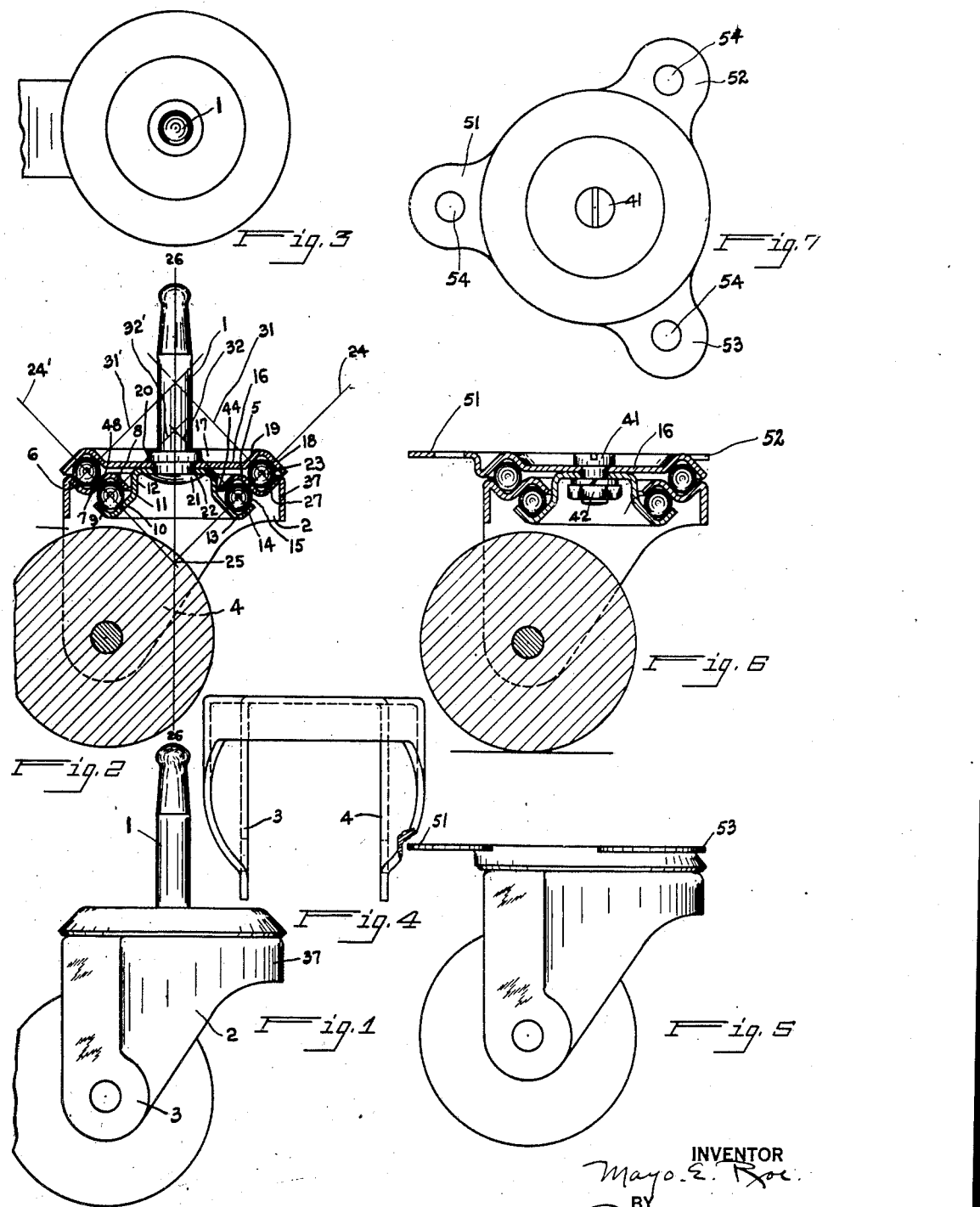
INVENTOR
Mayo E. Roe.
BY
Frank M. Slough
HIS ATTORNEY.

Patented Mar. 25, 1930

1,752,030

UNITED STATES PATENT OFFICE

MAYO E. ROE, OF ELYRIA, OHIO, ASSIGNOR TO THE COLSON COMPANY, OF ELYRIA, OHIO, A CORPORATION OF OHIO

CASTER

Application filed June 12, 1926. Serial No. 115,520.

My invention relates to casters and relates more particularly to ball-bearing casters of the type adaptable for use to support a hand truck, article of furniture, or the like.

An object of the present invention is to provide a caster capable of performing its swivelling function efficiently, even when the bearings are subjected to heavy loads.

Another object of my invention is to provide an improved form of caster in which many of the parts, comprising bearing races, may be fabricated from sheet steel in such a way as to be relatively non-deformable under severe conditions of stress and strain encountered in practice, and yet which will be light relative to similar parts commonly employed for the same general purposes.

Another object of my invention is to provide an improved caster mechanism comprising parts readily assembled and without the necessity of making careful adjustments of the different parts relative to each other.

Other objects of my invention and the invention itself will be readily apparent by reference to the following description of an embodiment thereof, and which embodiment, in different forms, is illustrated in the accompanying drawings forming a part of this specification, wherein:

Fig. 1 shows an elevational view of an embodiment of my invention;

Fig. 2 shows a longitudinal medial section thereof;

Fig. 3 is a plan view thereof;

Fig. 4 shows the caster fork element of the foregoing figures viewed in elevation;

Fig. 5 shows another embodiment of my invention in a side elevation;

Fig. 6 shows a vertical medial sectional view thereof;

Fig. 7 shows a plan view of Figs. 5 and 6.

Referring now first to the embodiment of my invention illustrated in Figs. 1 to 4, inclusive, and which illustrate a caster employing a caster stem, shown at 1, at 2, I show a caster fork comprising a pair of downwardly extending fork elements 3 and 4, and an upper yoke portion which is substantially of the form of an inverted cup and having a central aperture, at 44, its end wall 5 being of generally corrugated form to form on its upper and lower surface, bearing race surfaces 6 and 7, and 8 and 48, respectively. At 11, I show a second inverted cup element containing a center portion 12 projected upwardly through the aperture in the yoke 3 and having an outwardly extending flange 13, which provides bearing contacting race portions 9 and 10, respectively.

The peripheral portion 14 of the flange 13 is upturned to form a retaining ring for the set of bearing balls comprising balls 15. At 16, I show a load supporting top plate having a dished central portion 17 and a border portion comprising a peripheral downturned flange 18 and an intra-peripheral connecting portion 19 supporting the flange on the center portion. A caster stem 1, having a shoulder 20, rivet head 21 and rivet shank portion 22, by riveting the head, rigidly secures the top plate 16 and the inverted cup 11 together at their centrally perforated portions.

Two sets of bearing balls are employed, a lower inner set comprising bearing balls 15 and an upper outer set comprising bearing balls 23, the lower inner set of balls being disposed between race surfaces of the cup 11 and the yoke, and the upper outer set of bearing balls being disposed between race surfaces of the load top plate 16 and the yoke. Also, it will be noted that the bearing race surfaces of the top plate 16, intermediate yoke and inverted cup 11, which make bearing contact with the bearing balls of the two sets, are disposed in the path of a line 24, assumed to rotate on the caster swivelling axis 26 to all successive positions taken by bearing balls of the two sets, and which path includes the annular contacting portions of the said races and bearing balls.

I have provided other bearing race surfaces, comprising inclined portions of the plate, yoke and cup, as illustrated, at 19, 27, 8 and 14, which are disposed parallel to the conical path of the line 24. For each set of bearing balls, four separated bearing race portions are provided, separated relative to the axes of the bearing balls at angles of substantially 90 degrees.

It will be observed that in the embodiments of Figs. 1 to 4, inclusive, that for each bearing race surface, there will be an oppositely disposed race surface located beyond the axes of the intermediate bearing balls and disposed intermediate thereof, and at right angles thereto are a pair of opposing parallel bearing race surfaces.

It will also be observed that for each set of bearing balls there will be spaced angularly disposed contacting portions of a race element contacting with the balls in the same horizontal plane. This construction secures the result of transmitting the load placed upon the plate 16 downwardly to the yoke in directions oppositely and equally inclined to the vertical at an angle of 45 degrees. Lateral stresses may be communicated between the load supporting element and the stem carried by it and the yoke along any or all of the lines of action depicted at 24—24' and at 31—31' and 32—32', and which lines of action pass through the axes of the bearing balls and oppositely disposed bearing race surfaces, which project to intersection with the swivelling axis of the caster, illustrated as the line 26—26, Fig. 2.

The apron-like depending flange 18 for the top plate will also serve to restrict the entrance of dust and extraneous substances to the upper bearing race, and the apron 37 for the yoke will likewise so protect the lower bearing race, and both aprons will protect the bearings from striking extraneous objects.

The embodiment of my invention illustrated in Figs. 5 to 7, inclusive, need not be described in detail, as the structure is quite similar to that described, except that for the stem 1 is substituted the top plate 16 and the inverted cup 11, which are secured together by a screw 41 and nut 42 or by a rivet or any other suitable way, but omitting a stem. At 51, 52 and 53 are outwardly extending flanges disposed in the plane of the topmost portion of the top plate 16, these being perforated, as shown at 54, for the reception of bolts or screws to secure the load supporting plate 16 to the bottoms of trucks, or articles of furniture, or the like, sought to be movably supported on the caster.

Having thus described my invention in certain embodiments, I am aware that numerous and extensive departures may be made from the embodiments herein illustrated and described but without departing from the spirit of my invention.

I claim:

1. In a caster, the combination with a pair of superposed sheet metal disks joined at their central portions and extending divergingly in more remote portions, of a sheet metal caster fork element having a centrally perforated yoke, interposed between the diverging portions of said disks, the upper of said disks being folded to form an annular groove of substantially inverted V-form in transverse sections on its under surface, the lowermost disk being generally in the form of an inverted cup with divergent side walls and upturned outwardly extending rim portions to form an annular groove on the outer surface of the cup comprising upper surfaces of the said rim portion and adjacent outer surfaces of the divergent side walls; the side walls of the cup extending through the perforation in the yoke, the said interposed yoke portion being successively folded downwardly, upwardly and then downwardly in all radial sections proceeding inwardly from its border toward its central perforation to form a pair of concentric upper and lower bearing race grooves, of successively substantially V-form and inverted substantially V-form, radial sections, to cooperate with the grooves of the upper and lower disks, respectively, to retain separate sets of bearing balls in the said successive grooves.

2. In a caster the combination with a sheet metal wheel supporting fork having a transversely extending centrally perforated yoke, said yoke being successively folded proceeding inwardly towards its central perforation to form an annular groove on its upper surface, and an annular groove on its lower surface, concentric therewith and of less diameter than the upper surface groove; a pair of superposed sheet metal disks, joined together in their central portions, the upper of said disks being formed to have an annular groove disposed above the yoke upper surface groove and adapted to form with such upper surface groove opposing bearing races for a set of interposed bearing balls, the lower disk being in the form of an inverted cup and provided with an upturned outwardly extending rim and divergent side walls adjacent the rim, the upper outer surface of said rim and divergent side walls being disposed directly below the yoke groove of least diameter to form with said groove bearing races for a set of interposed bearing balls, said upper disk adapted to support a load.

3. In a caster, the combination with a pair of superposed sheet metal discs joined at their central portions and extending divergently in more remote portions, of a caster fork having a centrally perforated yoke, the upper of said discs being annularly folded to form a ball race groove of substantially inverted V-form in transverse sections on its lower surface, the lowermost disc being annularly folded to form a ball race groove of substantially V-form in transverse sections on its upper surface, said yoke being transversely interposed between the diverging portions of said discs and annularly folded in alternately opposite directions proceeding radially from its outer portion to its central perforation to form a pair of opposing substantially V-formed bearing race grooves each disposed in opposition to one of the aforesaid grooves to retain a set of bearing balls therebetween.

In testimony whereof I hereunto affix my signature this 27th day of May, 1926.

MAYO E. ROE.